(12) United States Patent  
Neet et al.

(10) Patent No.: US 7,821,166 B2  
(45) Date of Patent: Oct. 26, 2010

(54) DYNAMOELECTRIC MACHINE INSULATOR AND METHOD

(75) Inventors: Kirk Neet, Pendleton, IN (US); Ted Garcia, Noblesville, IN (US); Scott Bitzer, Fishers, IN (US); Michael T. York, Whitmore Lake, MI (US); Ryan Libler, Anderson, IN (US)

(73) Assignee: Remy Technologies, L.L.C., Anderson, IN (US)

( * ) Notice: Subject to any disclaimer, the term of this patent is extended or adjusted under 35 U.S.C. 154(b) by 333 days.

(21) Appl. No.: 11/872,249

(22) Filed: Oct. 15, 2007

(65) Prior Publication Data

US 2008/0252170 A1 Oct. 16, 2008

Related U.S. Application Data

(60) Provisional application No. 60/851,576, filed on Oct. 13, 2006.

(51) Int. Cl.
 *H02K 11/04* (2006.01)
 *H02K 19/36* (2006.01)

(52) U.S. Cl. ........................ 310/71; 310/68 D

(58) Field of Classification Search .................. 310/71, 310/260, 270, 68 D
See application file for complete search history.

(56) References Cited

U.S. PATENT DOCUMENTS

| 5,828,147 | A * | 10/1998 | Best et al. ................ 310/71 |
| 6,628,023 | B1 * | 9/2003 | Paquet .................... 310/71 |
| 6,825,586 | B2 * | 11/2004 | Edrington ................ 310/71 |
| 6,924,570 | B2 * | 8/2005 | De Filippis et al. ........ 310/71 |
| 2003/0020344 | A1 * | 1/2003 | Futami et al. ............. 310/71 |
| 2007/0278872 | A1 * | 12/2007 | Elser et al. ............... 310/71 |

* cited by examiner

*Primary Examiner*—Quyen Leung
*Assistant Examiner*—Leda Pham
(74) *Attorney, Agent, or Firm*—Cantor Colburn LLP

(57) ABSTRACT

A dynamoelectric machine insulator includes, a body having a plurality of holes therethrough at least some of the plurality of holes being receptive of a lead such that a lead extending through each of the plurality of holes is electrically isolated from a lead extending through each of the other of the plurality of holes, and at least one channel in the body extending arcuately along a perimetrical extent of the body. The at least one channel configured and dimensioned to insulate at least one lead routed therein.

16 Claims, 5 Drawing Sheets

US 7,821,166 B2

DYNAMOELECTRIC MACHINE INSULATOR AND METHOD

CROSS REFERENCE TO RELATED APPLICATION

This application claims priority to U.S. provisional application, 60/851,576, filed Oct. 13, 2006, the entire contents of which are incorporated herein by reference.

BACKGROUND OF THE INVENTION

Some dynamoelectric machines such as alternators, for example, have stators with leads that protrude axially therefrom. The leads are terminated at the end of the stator from which they extend. Some leads require routing circumferentially along an end of the stator before reaching their point of termination. Varnish is applied to the leads to attach them to and insulate them from end turns of windings of the stator as well as from one another. During operation of the dynamoelectric machine, however, if the varnish has not bonded the leads adequately to the end turns, vibration can cause the leads to become loose. Such looseness permits the leads to chafe against other components moving in relation to the leads possibly causing failure of insulation and electrical shorting. Additionally, the lead routings can block cooling airflow from passing through the space between the stator and an endplate of the slip ring end (SRE) housing causing inadequate cooling of the dynamoelectric machine.

Accordingly, alternate lead routings and points of termination of leads that overcome the above mentioned shortcomings would be desirable in the art.

BRIEF DESCRIPTION OF THE INVENTION

Disclosed herein is a dynamoelectric machine insulator. The insulator includes, a body having a plurality of holes therethrough at least some of the plurality of holes being receptive of a lead such that a lead extending through each of the plurality of holes is electrically isolated from a lead extending through each of the other of the plurality of holes, and at least one channel in the body extending arcuately along a perimetrical extent of the body. The at least one channel configured and dimensioned to insulate at least one lead routed therein.

Further disclosed herein is a method of insulating leads in a dynamoelectric machine. The method includes, feeding a plurality of leads of a stator axially through a plurality of holes in an insulator such that each hole has no more than one lead therein, and routing a plurality of leads within a plurality of channels in the insulator extending arcuately along a perimetrical extent of the insulator.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of several embodiments of the disclosed apparatus and method are presented herein by way of exemplification and not limitation with reference to the Figures.

Figure 1:
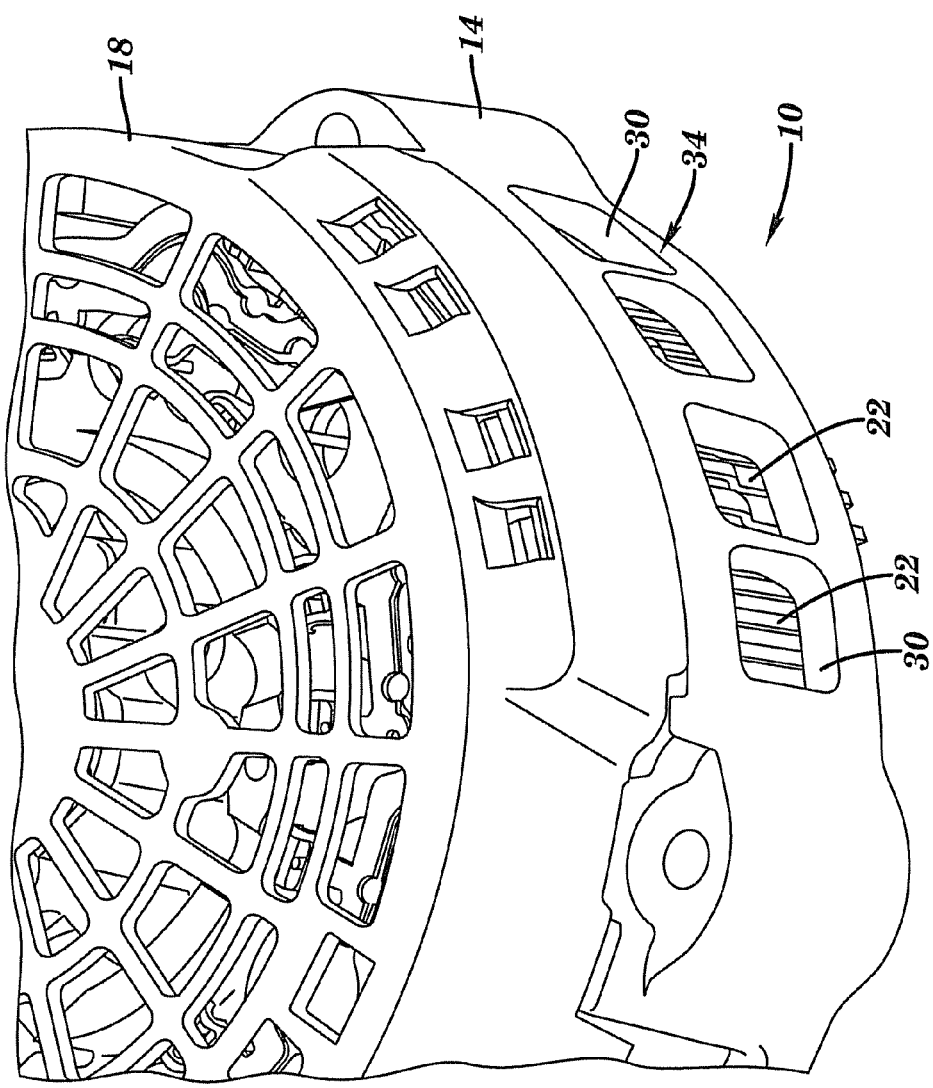
FIG. 1 depicts a partial perspective view of an alternator showing an insulator disclosed herein.

Referring to FIG. 1 a partial perspective view of a dynamoelectric machine, including an embodiment of the insulator disclosed herein, is illustrated generally at 10. In this embodiment the dynamoelectric machine 10 is an alternator that has a slip ring end (SRE) housing end plate 14 and a SRE cover 18. The SRE cover 18 is made from a nonconductive material such as polymer resin, for example, and is attached to the SRE housing end plate 14, which can be made of a conductive material such as aluminum, for example. Several conductive leads 22 with optional rectangular cross sections can be seen through cooling windows 30 in a perimetrical surface 34 of the SRE housing end plate 14. The number of leads 22 may vary depending upon the number of phases of the dynamoelectric machine, for example, and the leads 22 can be either neutral or positive. A portion of all of the leads 22 may extend substantially axially from an axial end of a stator (not shown).

Figure 2:
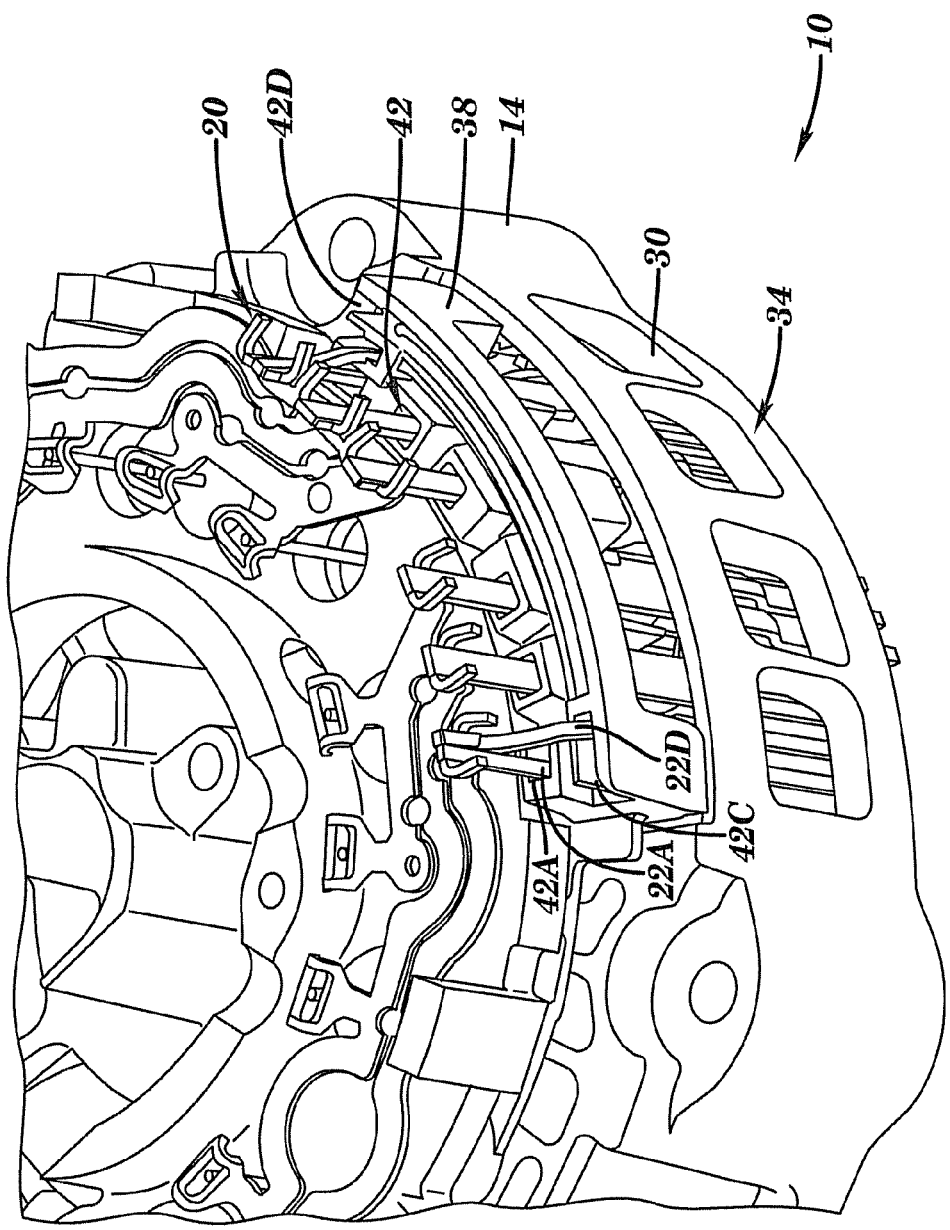
FIG. 2 depicts a partial perspective view of the alternator of FIG. 1 with the SRE cover removed.
Figure 5:
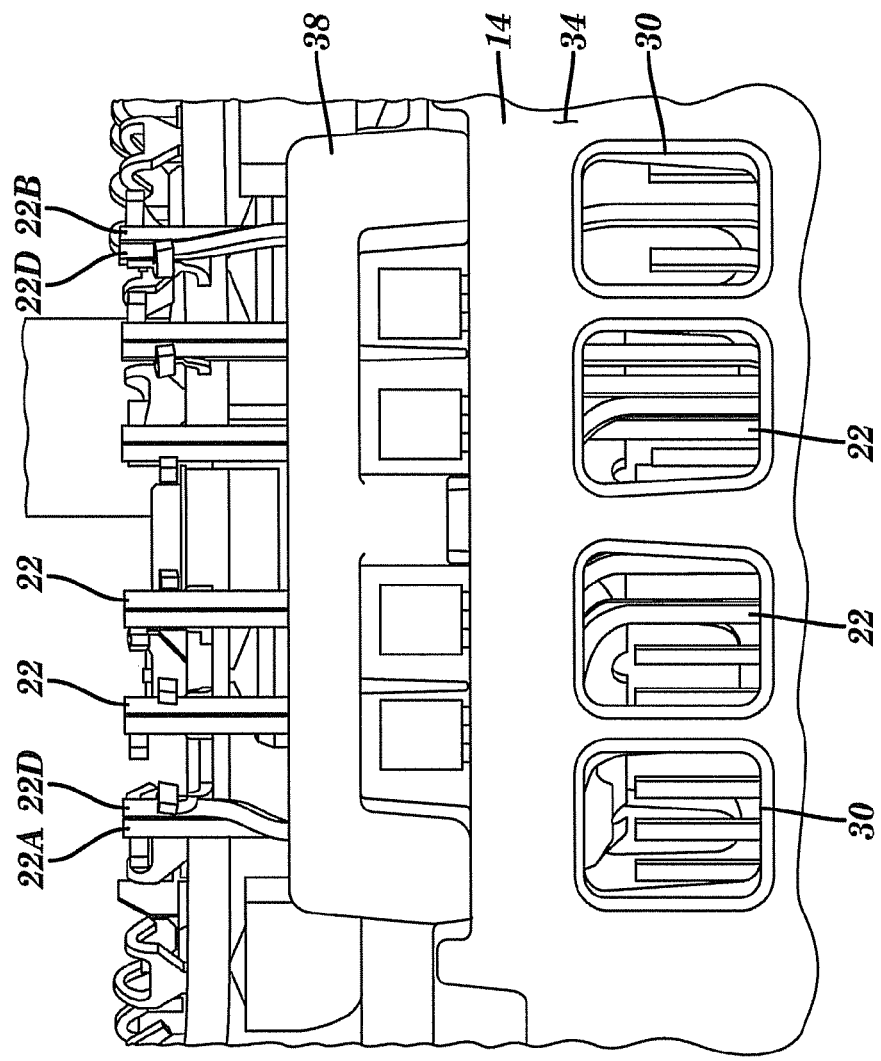
FIG. 5 depicts a partial side view of the alternator of FIG. 2.

Referring to FIG. 2 a partial perspective view of the alternator 10 of FIG. 1 is shown with the SRE cover 18 removed. An insulator 38, made of a nonconductive material such as plastic, for example, has a plurality of holes 42 through which the leads 22 extend. Termination of the leads 22 is completed on a side of the insulator 38 opposite a side on which the stator is located. The termination can be by methods such as welding, soldering or crimping within clips 20, for example, as is disclosed herein. Thus, the leads 22 extend substantially parallel to an axis of the stator through the holes 42 as best shown in FIG. 5, thereby allowing cooling air to flow around the leads 22, between the stator and the insulator 38, and out through the cooling windows 30 in the SRE housing end plate 14.

Figure 3:
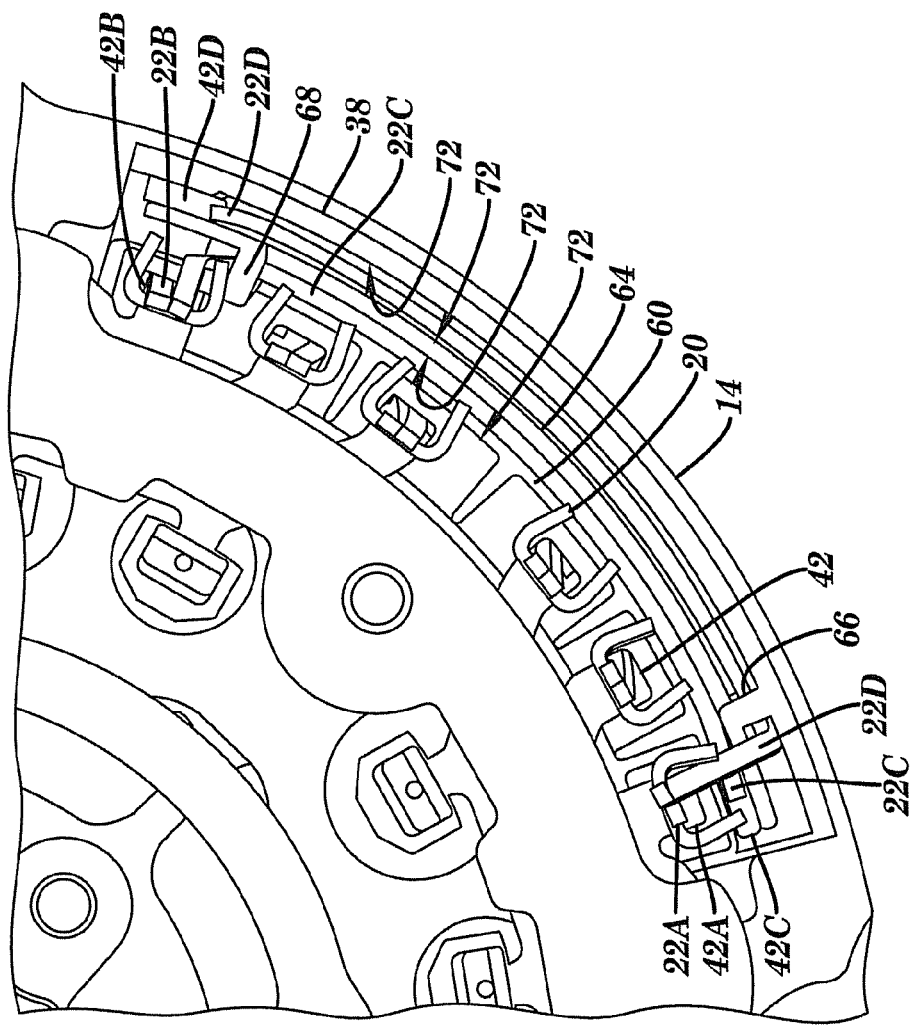
FIG. 3 depicts a plan view of the alternator of FIG. 2.

Referring to FIG. 3, each of the holes 42 in the insulator 38, has at least one lead 22 extending therethrough. In this embodiment the four central holes 42 each have a pair of leads 22 extending therethrough while the outer two holes 42A and 42B each have a single lead 22A and 22B extending therethrough respectively. There are two additional holes 42C and 42D that extend axially through the insulator 38 that have leads 22C and 22D extending therethrough respectively. The holes 42C and 42D are positioned at a greater radial dimension from an axis of the machine than are holes 42A and 42B. Additionally, the holes 42C and 42D are positioned within channels 60 and 64 in the insulator 38 that will be described below.

Figure 4:
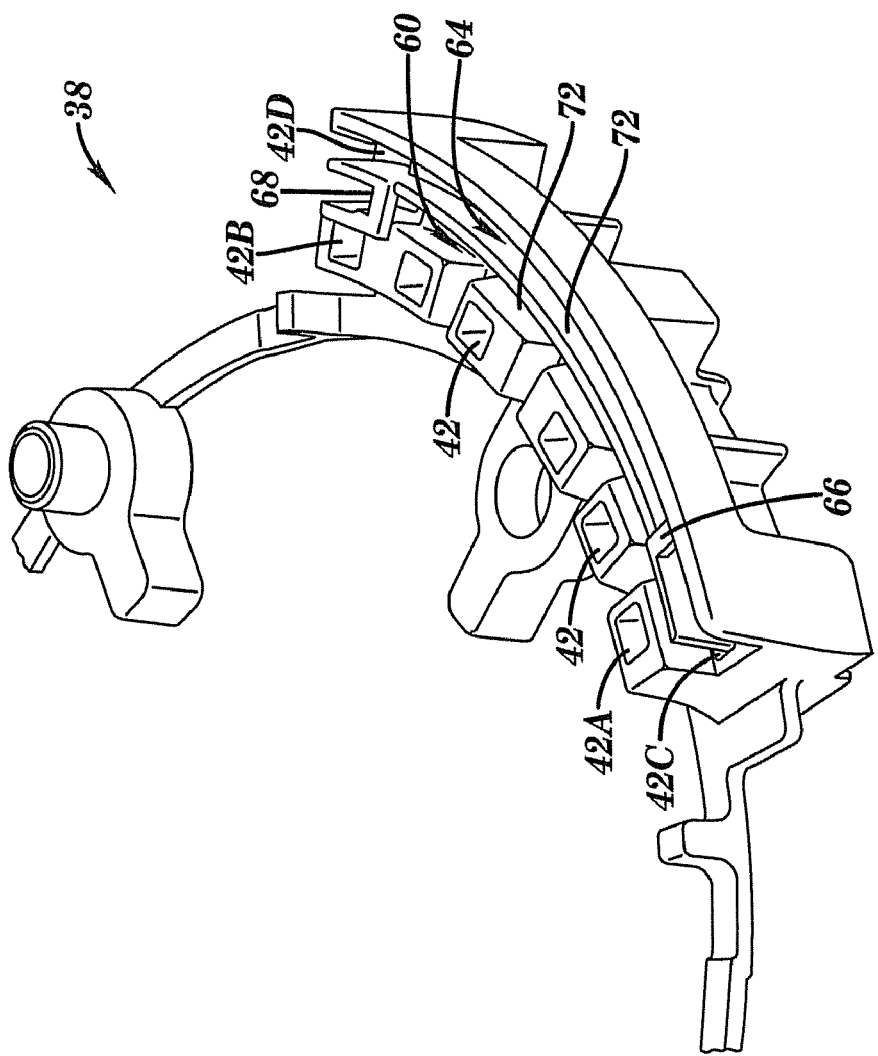
FIG. 4 depicts a partial perspective view of an insulator shown in FIG. 2.

The insulator 38 includes the inner perimetrical channel shown herein as inner circumferential channel 60 and the outer perimetrical channel shown herein as outer circumferential channel 64 (also shown in FIG. 4). The inner channel 60 routes the lead 22C from the hole 42C at a first circumferential end of the channel 60 to a second circumferential end of the channel 60 that is opposite the first circumferential end of the channel 60. The lead 22C is threaded through an optional retainer portion 68 of the insulator 38 near the second end of the channel 60 to provide retention of the lead 22C within the channel 60. Beyond the retainer portion 68 the lead 22C is bent radially inwardly and axially relative to the machine such that an end of the lead 22C is aligned with an end of the lead 22B. Thus, ends 22B and 22C can be electrically connected to one another through the crimp 20, for example, as described above. Similarly, the outer channel 64 routes the lead 22D from the hole 42D at a first circumferential end of the channel 64 to a second circumferential end of the channel 64 that is opposite the first circumferential end of the channel 64. Because the first circumferential end of channel 60 and channel 64 are located on opposite circumferential ends of the insulator 38, the lead 22C is routed in the opposite direction as the lead 22D. The lead 22D is threaded through an optional retainer portion 66 of the insulator 38 near the second end of the channel 64 to provide retention of the lead 22D within the channel 64. Beyond the retainer portion 66 the lead 22D is bent radially inwardly and axially relative to the machine such that an end of the lead 22D is aligned with an end of the lead 22A. Thus, ends 22A and 22D can be electrically connected to one another through the crimp 20, for example.

Several features of embodiments disclosed herein contribute to prevention of short-circuiting of the leads 22. For example, the insulator 38 is made of nonconductive material such as polymer resin that may be fabricated by a process such as injection molding, for example. Additionally, the portion of the leads 22C and 22D, that are routed through the channels 60 and 64 respectively, can have an additional nonconductive sleeve (not shown) applied therearound. Walls 72 on either side of the channels 60, 64 provide additional protection against short-circuiting of the leads 22. The retainer portions 66 and 68 help retain the leads 22D and 22C respectively within the channels. And further, the cover 18, when assembled to the machine 10, serves to entrap the leads 22C and 22D within the channels 60 and 64.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A dynamoelectric machine insulator, comprising:
   a body having a plurality of holes therethrough at least some of the plurality of holes being receptive of a lead such that a lead extending through each of the plurality of holes is electrically isolated from a lead extending through each of the other of the plurality of holes; and
   at least one channel in the body extending arcuately along a perimetrical extent of the body, the at least one channel configured and dimensioned to insulate at least one lead routed therein.

2. The dynamoelectric machine insulator of claim 1, further comprising a retainer portion bridging at least one channel to thereby retain within the at least one channel a lead routable therein.

3. The dynamoelectric machine insulator of claim 1, further comprising holes on opposite ends of the perimetrically extending body receptive of leads connectable to one another.

4. The dynamoelectric machine insulator of claim 1, wherein the body is receptive of a nonconductive cover to enclose the at least one channel.

5. The dynamoelectric machine insulator of claim 1, wherein the at least one channel is receptive of a lead with insulative sleeves applied thereon.

6. The dynamoelectric machine insulator of claim 1, wherein the body is mountable to a slip ring end housing such that a cooling airflow gap exists between the insulator and a stator within the slip ring housing.

7. The dynamoelectric machine insulator of claim 1, wherein the at least one channel is located on a side of the insulator opposite a side of the insulator from which leads are insertable.

8. The dynamoelectric machine insulator of claim 1, further comprising a plurality of channels in the body extending arcuately along a perimetrical extent of the body, the plurality of channels configured and dimensioned to insulate a plurality of leads routed therein at least from each other.

9. The dynamoelectric machine insulator of claim 8, wherein one of the plurality of channels is positioned radially outwardly of another of the plurality of channels.

10. The dynamoelectric machine insulator of claim 8, wherein the plurality of channels are located on a side of the insulator opposite a side of the insulator from which leads are insertable.

11. The dynamoelectric machine insulator of claim 8, wherein the body is mountable to a slip ring end housing such that a cooling airflow gap exists between the insulator and a stator within the slip ring housing.

12. The dynamoelectric machine insulator of claim 8, wherein at least two of the plurality of leads are routed in the plurality of channels in opposite directions.

13. The dynamoelectric machine insulator of claim 1, wherein the plurality of holes includes eight holes.

14. The dynamoelectric machine insulator of claim 1, wherein the plurality of holes and the at least one channel is receptive of a lead with a substantially rectangular cross section.

15. The dynamoelectric machine insulator of claim 1, wherein the dynamoelectric machine is an alternator.

16. The dynamoelectric machine insulator of claim 1, wherein the insulator is made of polymer resin.

* * * * *